United States Patent
Hurst et al.

(10) Patent No.: US 7,535,419 B2
(45) Date of Patent: May 19, 2009

(54) METHOD FOR DATA EXCHANGE BETWEEN MILITARY AIRCRAFT AND DEVICE FOR CARRYING OUT THIS METHOD

(75) Inventors: Peter Hurst, Unterhaching (DE); Ludwig Mehltretter, Riemerling (DE); Monika Von Der Werth, Höhenkirchen (DE)

(73) Assignee: EADS Deutschland GmbH, Ottobrunn (DE)

( * ) Notice: Subject to any disclaimer, the term of this patent is extended or adjusted under 35 U.S.C. 154(b) by 630 days.

(21) Appl. No.: 10/972,335

(22) Filed: Oct. 26, 2004

(65) Prior Publication Data
US 2009/0079631 A1    Mar. 26, 2009

Related U.S. Application Data

(63) Continuation of application No. PCT/DE03/01358, filed on Apr. 25, 2003.

(30) Foreign Application Priority Data

Apr. 27, 2002    (DE)    ................. 102 19 023

(51) Int. Cl.
*H01Q 3/00*    (2006.01)
*H04B 7/00*    (2006.01)

(52) U.S. Cl. ............... 342/359; 342/367; 455/25

(58) Field of Classification Search ............ 342/367, 342/359; 455/25, 431, 63.4
See application file for complete search history.

(56) References Cited

U.S. PATENT DOCUMENTS

| | | | |
|---|---|---|---|
| 3,781,890 A * | 12/1973 | Boyer | 342/367 |
| 4,851,854 A | 7/1989 | Drogin et al. | 342/417 |
| 4,899,293 A | 2/1990 | Dawson et al. | 345/423 |
| 5,027,124 A | 6/1991 | Fitzsimmons et al. | 342/362 |
| 5,680,142 A * | 10/1997 | Smith et al. | 342/372 |
| 5,880,693 A * | 3/1999 | Drummer | 342/357.02 |
| 5,883,586 A | 3/1999 | Tran et al. | 340/945 |
| 6,018,659 A * | 1/2000 | Ayyagari et al. | 455/431 |
| 6,188,913 B1 * | 2/2001 | Fukagawa et al. | 455/562.1 |
| 6,218,986 B1 * | 4/2001 | Yukitomo et al. | 342/372 |
| 6,259,976 B1 | 7/2001 | Lemelson et al. | 701/3 |
| 6,377,211 B1 * | 4/2002 | Hsiung | 342/359 |
| 6,931,232 B1 * | 8/2005 | Wolcott | 455/12.1 |
| 2001/0044680 A1 | 11/2001 | Lemelson et al. | |

FOREIGN PATENT DOCUMENTS

DE    19543321    5/1997

(Continued)

*Primary Examiner*—Gregory C Issing
(74) *Attorney, Agent, or Firm*—Greenblum & Bernstein, P.L.C.

(57) ABSTRACT

A device for user data transmission implemented in an aircraft for transmitting user data to a relay aircraft. The device includes a controllable directional antenna arrangement and an antenna steering module that is structured and arranged to control radiation properties and transmitting power of the antenna arrangement. Moreover, the device includes an antenna orientation module and a threat management system. Additionally, the device includes an optimization device. Furthermore, the threat management system and the optimization device are associated with the antenna steering module and the optimization device receives a desired radiation profile from the threat management system and a desired direction range of an antenna lobe from the antenna orientation module. The instant abstract is neither intended to define the invention disclosed in this specification nor intended to limit the scope of the invention in any way.

23 Claims, 4 Drawing Sheets

FOREIGN PATENT DOCUMENTS

| | | |
|---|---|---|
| DE | 19853905 | 6/2000 |
| DE | 19853933 | 6/2000 |
| DE | 19737136 | 11/2001 |
| EP | 0837567 | 4/1998 |
| EP | 1187353 | 3/2002 |

* cited by examiner

Figure 1

PRIOR ART

METHOD FOR DATA EXCHANGE BETWEEN MILITARY AIRCRAFT AND DEVICE FOR CARRYING OUT THIS METHOD

CROSS-REFERENCE TO RELATED APPLICATIONS

The present application is a Continuation of International Application No. PCT/DE03/01358, filed Apr. 25, 2003 and claims priority of German Patent Application No. 102 19 023.2, filed on Apr. 27, 2002. Moreover, the disclosure of International Patent Application No. PCT/DE03/01358 filed Apr. 25, 2003 is expressly incorporated by reference herein in its entirety.

BACKGROUND OF THE INVENTION

1. Field of the Invention

The present invention relates to a method for the transmission of user data between military aircraft via antennas with controllable directional effect and a device for carrying out the method.

2. Discussion of Background Information

With data exchange between military aircraft, it is of the greatest importance that they are not discovered in an environment threatened by enemy reconnaissance systems. Military aircraft have been hitherto equipped for data transmission with omnidirectional antennas that essentially transmit and receive in the azimuth range and in the elevation range are active only in a limited angular range.

Very high powers are necessary to transmit user data via these omnidirectional antennas. This is because the data transmission takes place in a broadband manner due to the size of the data quantities. Moreover, transmission with omnidirectional characteristics can be realized only with high-energy expenditure. This results in a very unfavorable ratio between the locatability range and the transmission range. Usually a minimum transmitting power of 1 watt is necessary, resulting in a transmission range for the user data of approximately 50 km. In this case, however, the transmitting aircraft is locatable from a distance of approximately 1000 km.

Furthermore, directional antennas are known from the prior art, i.e., antennas that produce pivoting antenna main lobes for transmitting and receiving. Since the radiation is also emitted essentially in the azimuth range, and thus only a small antenna surface is available on the aircraft, these directional antennas have a very unfavorable ratio between the locatability range and the transmission range that results in a range between 0.5 and 5. Usually with these directional antennas, a user data transmission range of 100 km and a locatability in the range of 50 km is still achieved, if the enemy reconnaissance system is located outside the antenna main lobe. However, these relative sizes are obtained only with a special so-called power management, i.e., with a transmitting power adapted to the conditions and in particular to the distances between the transmitting and receiving aircraft.

Furthermore, user data transmission systems are known from the prior art in which satellites are used as relay stations. The user data has to be transmitted with great power due to the very great transmission range, so that a great locatability range occurs.

Furthermore, delays in the transmission time have to be taken into consideration. If geostationary satellites are not used, several such relay stations may be necessary, which is associated with higher costs.

An antenna orientation arrangement for an aircraft is known from DE 198 53 933 A1, which arrangement is connected to an attitude reference system of the aircraft in order to control the orientation of the antenna lobe.

Figure 1:
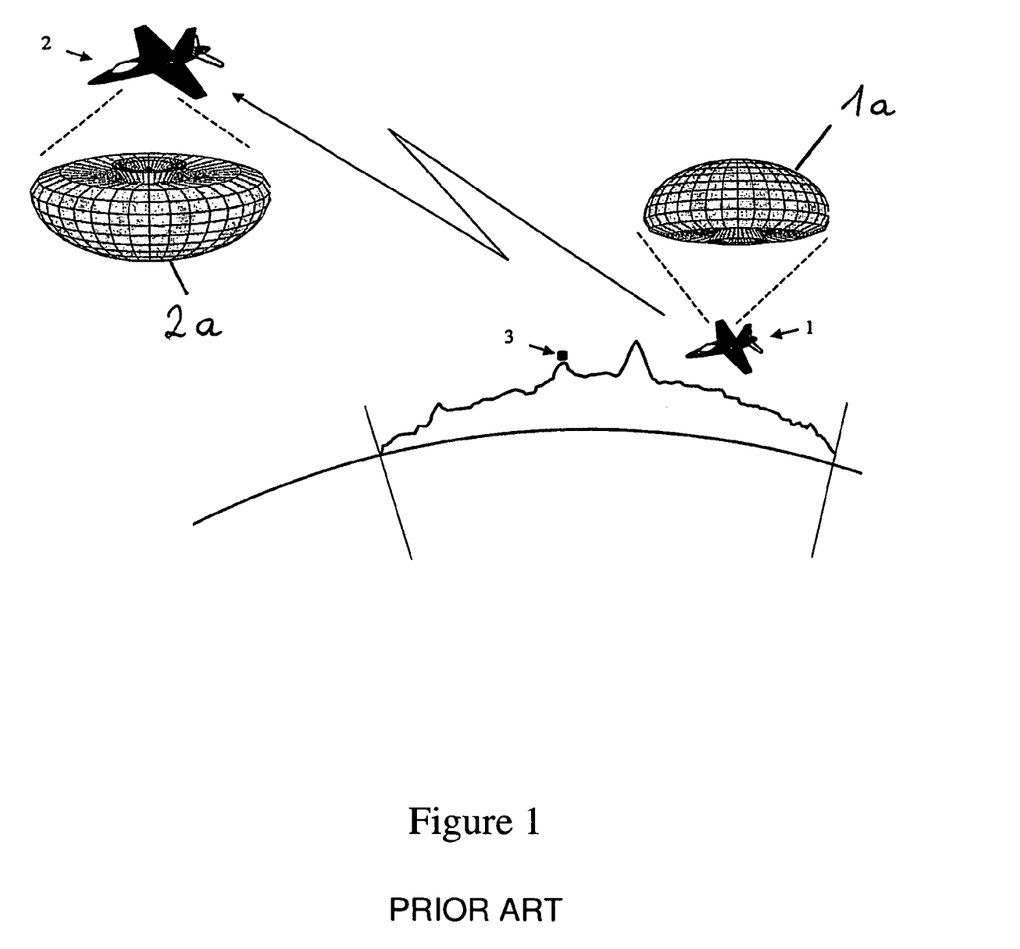
FIG. 1 shows a diagrammatic representation of the terrain with a low-flying aircraft that features an omnidirectional antenna device and characteristic known from the prior art, with a receiving aircraft flying higher and with a locating station shown by way of example that is regarded as hostile with respect to the aircraft shown.

The constellation shown in FIG. 1 of a low-flying transmitting aircraft 1 and a high-flying receiving aircraft 2, and a locating station 3 to be regarded as hostile with respect to the aircraft shown, shows in a diagrammatic manner a situation in a reconnaissance mission in enemy territory as shown according to the prior art. The antenna diagrams or characteristics of the transmitting aircraft 1 and of the receiving aircraft 2 resulting from the customary omnidirectional antennas are shown diagrammatically and labeled with reference numbers 1a or 2a.

In a threat scenario, the locating station 3 is able to detect electromagnetic rays and to determine their direction. This can take place, if necessary, in interaction with other locating stations. The locatability increases with the transmitting power of the aircraft 1 respectively transmitting user data. The aircrafts position can then be determined with great precision through customary methods such as, e.g., triangulation with several such locating stations 3.

SUMMARY OF THE INVENTION

An aspect of the present invention is to provide a method or a device with which a user data transmission between military aircraft takes place in a manner in which a quantity of the transmitted user data is not reduced compared with the prior art. Additionally, locatability is reliably eliminated or at least greatly reduced.

This aspect is attained with the features of the present invention including a device for user data transmission for implementation in an aircraft for transmitting user data to a relay aircraft via an antenna arrangement with controllable directional effect by an antenna steering module for controlling the radiation properties and transmitting power. The device further includes a user data transmission module for providing user data to the relay aircraft. The device also includes a receiver device for receiving information from the relay aircraft and an antenna orientation module that is assigned to a flight attitude computer. Furthermore, the device has a threat management system and an optimization device connected thereto which are assigned to the steering module, which device receives a desired radiation profile from the threat management system and a desired direction range of the antenna lobe from the antenna orientation module. Moreover, the device determines the antenna transmission properties to be produced by the steering module, and transmits them to the steering module as a control command.

A further aspect of the device can include user data transmission via an antenna arrangement with controllable directional effect for implementation in a transmitting aircraft in which the antenna transmission properties include the angular range, the side lobe loss for the radiation of the antenna lobes and/or a maximum transmitting power. Moreover, the threat management system can receive and use information on the current transmission quality, in which the current transmission quality is determined by the receiver device on the basis of information through the relay aircraft. Furthermore, in the device the desired direction of the antenna lobe can be determined in the antenna orientation module on the basis of the relative position of the transmitting aircraft relative to the relay aircraft and the flight attitude of the transmitting aircraft. Additionally, the device can include a decision device connected to the antenna steering module which can be provided that stops the user data transmission of the transmitting aircraft when the probability of the locatability of the transmitting aircraft exceeds a comparative value. Moreover, the transmission properties can be set through the antenna control unit such that the side lobe loss is at least 30 dB.

The aspect is further attained with a method for user data transmission in which user data is transmitted from a first aircraft to a relay aircraft for retransmission to another aircraft. The method being used with a device for user data transmission which is arranged in the first aircraft and the relay aircraft. Moreover, in the method an optimization of the transmission properties takes place in the transmitting aircraft in which a desired radiation profile is assessed by a threat management system and a desired direction range of the antenna lobe is assessed by an antenna orientation module. The aspect can further include the current transmission quality, that is determined by information fed to a receiver device, is assessed.

According to the present invention, a device for user data transmission is provided for implementation in an aircraft to a relay aircraft via an antenna arrangement with controllable directional effect by an antenna steering module for controlling the radiation properties and transmitting power. Moreover, the device includes a user data transmission module for providing user data to the relay aircraft and a receiver device for receiving information from the relay aircraft. Additionally, the device includes an antenna orientation module that is assigned to a flight attitude computer. A threat management system and an optimization device connected thereto are assigned to the control module, which device receives at least: a desired radiation profile from the threat management system, and a desired direction range of the antenna lobe from the antenna orientation module, that determines the antenna transmission properties to be produced by the steering module and transmits them to the steering module as a control command.

With the device for user data transmission according to the present invention, the angular range, and the side lobe loss for the radiation of the antenna lobes and/or a maximum transmitting power can be used for the antenna transmission properties. The threat management system can furthermore receive and use information on the current transmission quality. Moreover, the current transmission quality is determined by the receiver device on the basis of information through the relay aircraft. Additionally, the desired direction of the antenna lobe can be determined in the antenna orientation module on the basis of the relative position of the transmitting aircraft relative to the relay aircraft and the flight attitude of the transmitting aircraft. Furthermore, a decision device can be connected to the steering device that stops the user data transmission of the transmitting aircraft when the probability of the locatability of the transmitting aircraft exceeds a comparative value. The transmission properties through the antenna control unit can be adjusted such that the side lobe loss is at least 30 dB.

According to the present invention, a method for user data transmission is provided in which user data are transmitted from a first aircraft to a relay aircraft for retransmission to another aircraft. The method is realized through the interaction of functions for user data transmission implemented in the aircraft. Moreover, an optimization of the transmission properties thereby occurs in the transmitting aircraft, in which optimization of a desired radiation profile is assessed by a threat management system. In the method, a desired direction range of the antenna lobe is assessed by an antenna orientation module, and optionally also the current transmission quality of the transmission to the relay aircraft is assessed.

With the method according to the present invention or the devices according to the present invention, the locatability of the respectively transmitting aircraft is reliably eliminated or at least greatly reduced. According to the present invention the respectively transmitting aircraft radiates only in the direction of the relay aircraft, i.e., not in the azimuth angular range. In contrast, through a corresponding antenna that can be easily attached to the wings of the aircraft, it is possible to transmit narrow antenna main lobes radiating approximately vertically to the earth's surface to a second aircraft flying above the transmitting aircraft. Thereby the aircraft flying higher can be locatable in particular when retransmitting user data to other aircraft, which, however, is not a disadvantage if it is flying at a sufficient altitude and in an area with a relatively low threat.

One aspect of the present invention includes a device for user data transmission implemented in an aircraft for transmitting user data to a relay aircraft. The device includes a controllable directional antenna arrangement and an antenna steering module that is structured and arranged to control radiation properties and transmitting power of the antenna arrangement. Moreover, the device includes an antenna orientation module and a threat management system. Additionally, the device includes an optimization device. Furthermore, the threat management system and the optimization device are associated with the antenna steering module and the optimization device receives a desired radiation profile from the threat management system and a desired direction range of an antenna lobe from the antenna orientation module.

In a further aspect of the invention, a user data transmission module that can be configured to provide user data to the relay aircraft and a receiver device can receive information from the relay aircraft. Moreover, the optimization device can determine antenna transmission properties to be produced by the antenna steering module and can transmit the antenna transmission properties to the steering module as a control command. Furthermore, the antenna transmission properties can include one of an angular range, a side lobe loss for radiation of the antenna lobes, and a maximum transmitting power. Moreover, the threat management system can receive and use information on a current transmission quality, in which the current transmission quality is determined by the receiver, based on the information from the relay aircraft. Additionally, the desired direction range of the antenna lobe can be determined in the antenna orientation module on a basis of a relative position of the transmitting aircraft relative to the relay aircraft and a flight attitude of the transmitting aircraft. Furthermore, the device can include a decision device connected to the antenna steering module that can be structured and arranged to stop the user data transmission of the transmitting aircraft when a probability of a locatability of the transmitting aircraft exceeds a comparative value. The device can further include an antenna control unit that can be structured and arranged to set the transmission properties such that a side lobe loss is at least 30 dB. Moreover, the antenna orientation module can be associated with a flight attitude computer.

Another aspect of the present invention is directed to a method for user data transmission in which user data is transmitted from a first aircraft to a relay aircraft for retransmission to another aircraft. The method includes arranging a device for user data transmission in the first aircraft and the relay aircraft and assessing a desired radiation profile by a threat management system. Moreover, the method includes obtaining a desired direction range of an antenna lobe by an antenna orientation module.

In a further aspect of the invention, the method can further include determining a current transmission quality based upon information fed to a receiver. Moreover, optimization of the transmission properties can take place in the transmitting aircraft. Furthermore, an aircraft can have a data transmission device using the above-noted method.

Yet another aspect of the present invention includes a device for user data transmission for an aircraft. The device includes a controllable directional antenna arrangement and an antenna steering module that is structured and arranged to control radiation properties and transmitting power of the antenna arrangement. Moreover, the device includes an antenna orientation module and a threat manager. The device further including an optimizer and moreover the threat manager and the optimizer are associated with the antenna steering module and the optimizer receives a desired radiation profile from the threat manager and a desired direction range of an antenna lobe from the antenna orientation module.

In a further aspect of the present invention, the device can include a user data transmitter that is configured to transmit user data to a relay aircraft and a receiver that receives information from the relay aircraft. Moreover, the optimizer device can determine antenna transmission properties to be produced by the antenna steering module and can transmit the antenna transmission properties to the steering module as a control command. Furthermore, the antenna transmission properties can include one of an angular range, a side lobe loss for radiation of the antenna lobes, and a maximum transmitting power. Additionally, the threat manager can receive and use information on a current transmission quality, in which the current transmission quality is determined by the receiver based on the information from the relay aircraft. Moreover, the desired direction range of the antenna lobe can be determined in the antenna orientation module on a basis of a relative position of the transmitting aircraft relative to the relay aircraft and a flight attitude of the transmitting aircraft. The device can further include a decider connected to the antenna steering module that is structured and arranged to stop the user data transmission of the transmitting aircraft when a probability of a locatability of the transmitting aircraft exceeds a comparative value. Additionally, the device can include an antenna controller that is structured and arranged to set the transmission properties such that a side lobe loss is at least 30 dB.

Another aspect of the invention includes a method for user data transmission in which user data is transmitted from an aircraft. The method includes determining a desired radiation profile by a threat management system and determining a desired direction range of an antenna lobe by an antenna orientation module. Moreover, the method includes transmitting the user data with the desired radiation profile and in the desired direction range. Additionally, the method can include determining a current transmission quality based upon information fed to a receiver.

DETAILED DESCRIPTION OF THE PRESENT INVENTION

Figure 2:
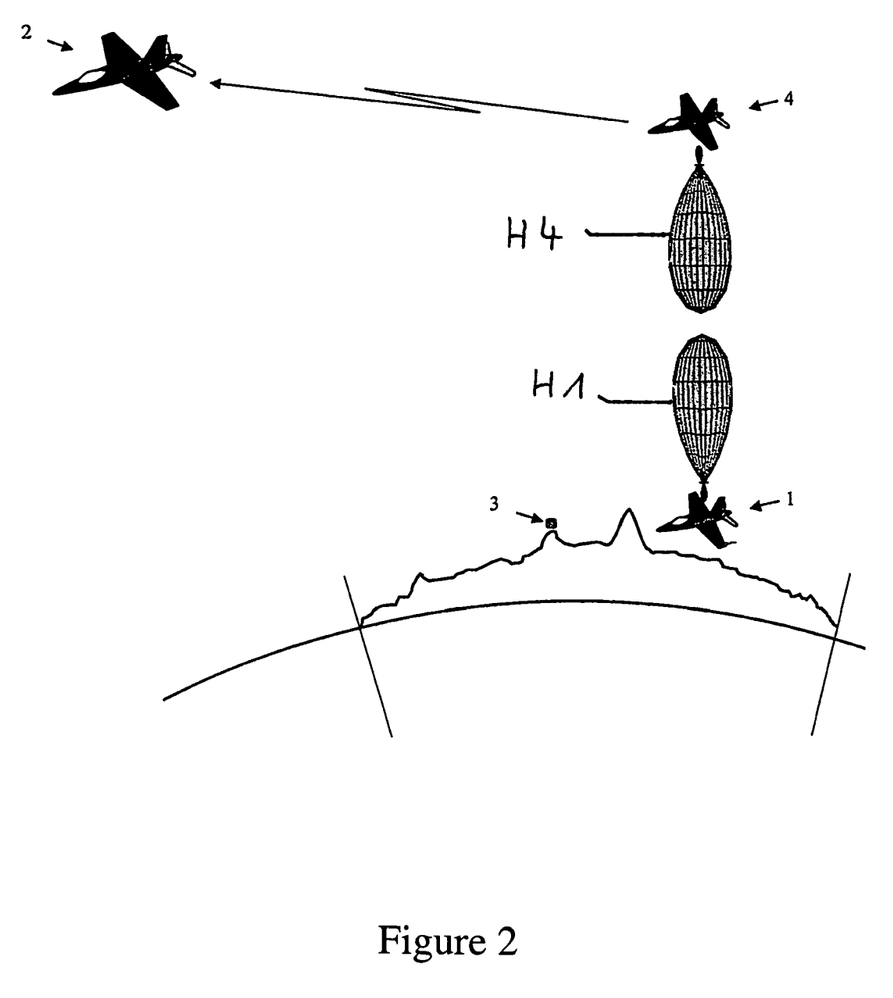
FIG. 2 shows a diagrammatic representation of an aircraft that features an antenna arrangement according to the present invention for transmitting user data, in which aircraft the method according to the present invention can be carried out.

FIG. 2 diagrammatically shows a constellation of a low-flying transmitting aircraft 1 and a high-flying receiving aircraft 2, and a locating station 3 to be regarded as hostile with respect to the aircraft shown. According to the present invention, an additional relatively high-flying relay aircraft 4 is provided for the user data exchange according to the present invention, which aircraft receives user data from the lower flying aircraft 1 and retransmits the user data to the aircraft 2 provided for reception. During the user data transmission, the flight altitude of the relay aircraft 4 is greater than the flight altitude of the low-flying aircraft 1. The antenna main lobe H1 produced by the corresponding system of the relatively low-flying transmitting aircraft 1 is thereby oriented according to the present invention within an opening lobe of a maximum of 30° vertically to the earth's surface upwards to the relay aircraft 4. With an antenna main lobe H4 according to the present invention directed vertically to the earth's surface downwards to the transmitting aircraft 1, which antenna main lobe preferably features an opening lobe of a maximum of 30°. The relay aircraft 4 receives the user data and retransmits the user data with customary omnidirectional antennas or also directional antennas.

Whereas the aircraft 1 has to correct the orientation of its antenna main lobe depending on the flight attitude, the relay aircraft 4 needs to make only minor readjustments, due to its smoother flight path or its flight path featuring relatively few flight attitude or flight altitude changes. If the aircraft 1 and aircraft 4 are not in precisely the same geographic position, thus if they are not flying one above the other, in addition a corresponding pivoting of the antenna main lobe of the aircraft 1 and 4 is to be carried out in accordance with the different positions of the same. This requires the transmission of the positions of the aircraft 1 and 4 so that, with the knowledge of their own flight attitude, the calculation can be made of the adjusting angle for the antenna readjustment of aircraft 1 and, if necessary, also of the relay aircraft 4.

Figure 3:
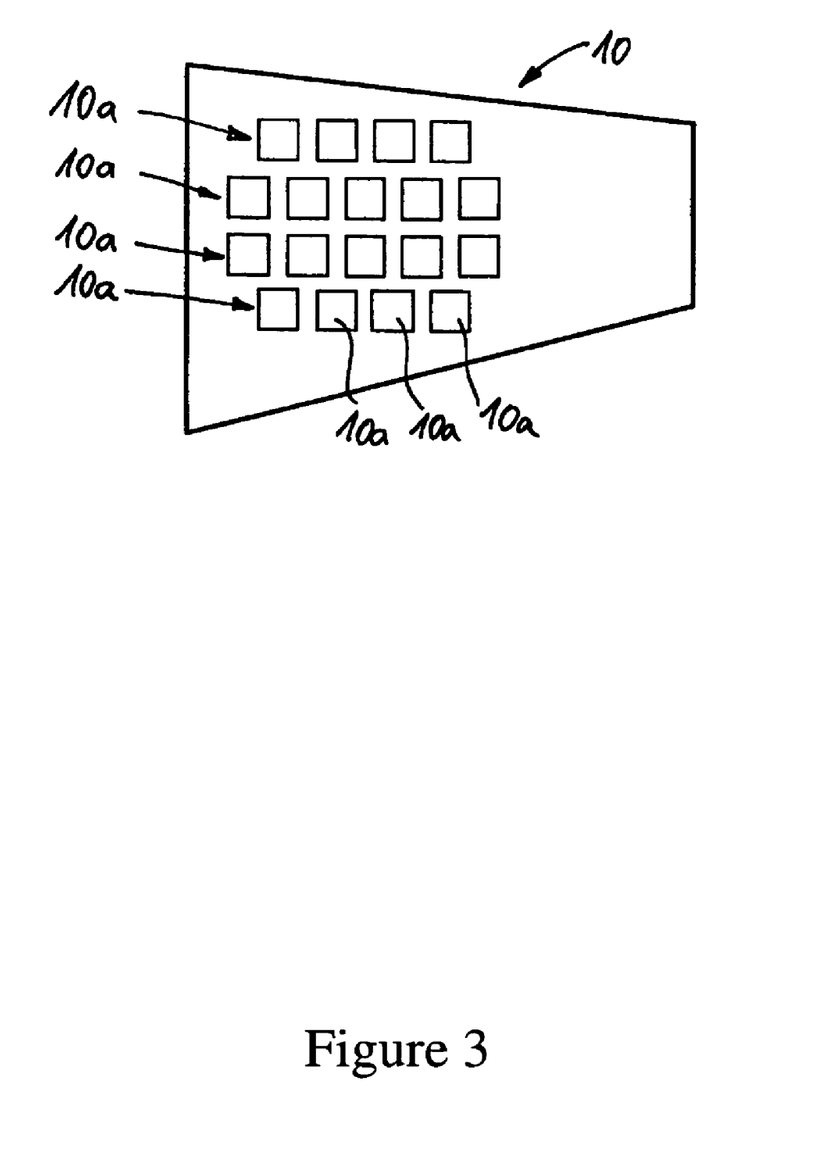
FIG. 3 shows an embodiment of an antenna device that is provided for use with the device according to the present invention or the method according to the present invention.

FIG. 3 shows in diagrammatic form an exemplary embodiment of an antenna device for user data transmission. This is an antenna device from a field of individual antennas (elementary antennas) 10a that are attached to the wing surfaces of the aircraft 1 and 4. According to the present invention, an antenna design is provided with which the largest possible antenna surface is given. This depends on the constraints of the specific case, thus, e.g., the design and type of use of the aircraft. Preferably an antenna surface is provided that is twice as large as with an assumption of twice the antenna gain including the loss of the antenna.

Figure 4:
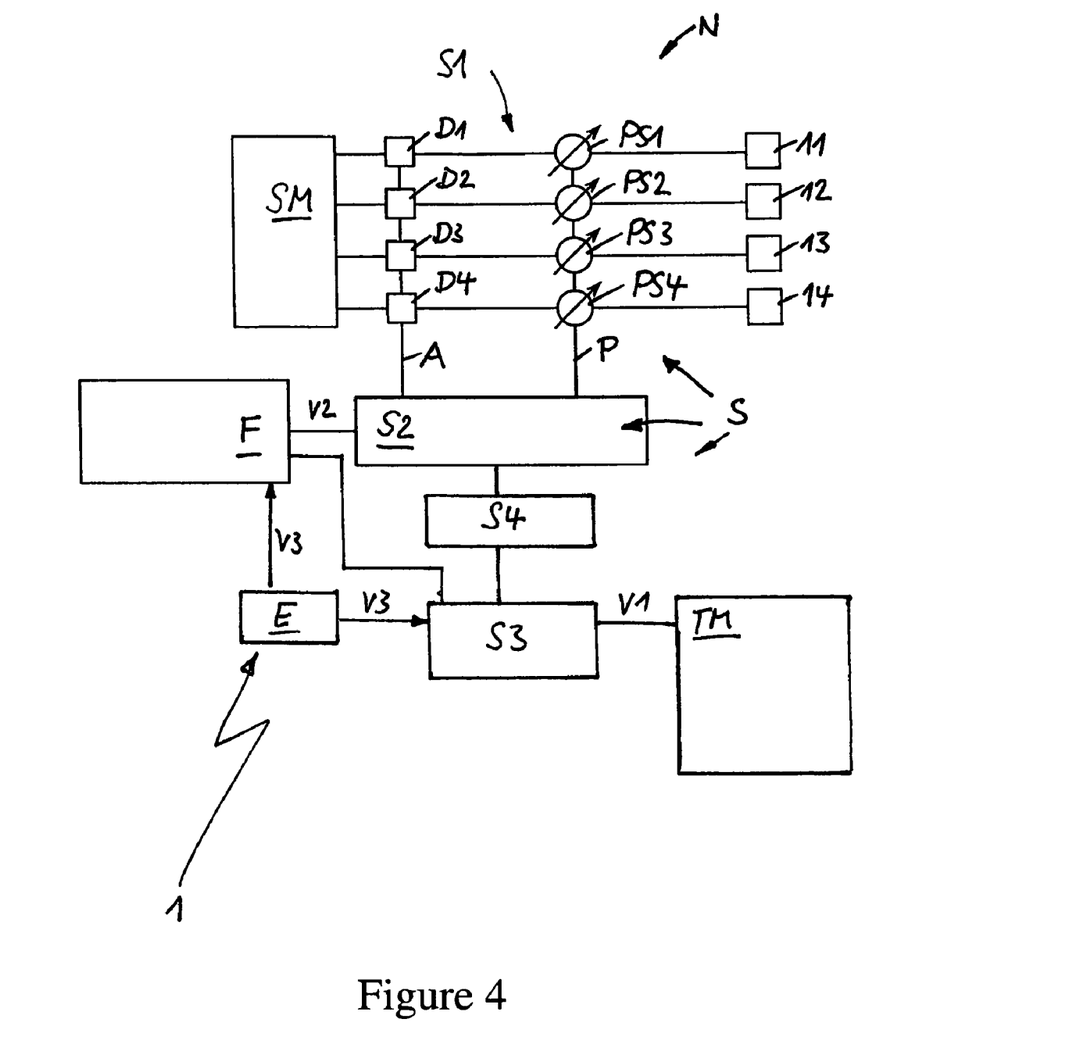
FIG. 4 shows an embodiment of the device according to the present invention for transmitting user data.

To align the antenna main lobe and to transmit user data, a device N for transmitting user data is provided in the transmitting aircraft 1 with: a user data transmission module SM for providing user data to be transmitted to the relay aircraft; an adjustment or control device S1 for realizing the antenna transmission properties and an antenna adjustment or steering unit S2 assigned to it; a receiver device E for receiving data from the relay aircraft; a threat management system TM or threat assessment system; and an antenna orientation module F that is assigned to a flight attitude computer.

These units are functionally connected to one another, e.g., via a data bus, and can be integrated in equipment-related terms in units of their own or integrated in a computer module.

The user data transmission module SM receives the user data prepared by a computer unit and optionally with correspondingly assigned system functions and to be transmitted by the device N. On the other hand, the user data transmission module SM can have functions with which received user data can be retransmitted to assigned units or for functional further processing to other internal aircraft systems.

An antenna orientation unit S is assigned to the user data transmission module SM or to the device for user data transmission N, which antenna orientation unit establishes and realizes the transmission properties of the antenna on the basis of commands from the steering unit S2. In the embodiment of FIG. 4, the antenna control device S1 has four channels with respectively one attenuator D1, D2, D3, D4, a phase shifter PS1, PS2, PS3, PS4 and a sub-antenna 11, 12, 13, 14. The number of channels is based on known criteria and the specific use. The control values are the amplitudes A and phases P of the individual antennas 11, 12, 13, 14 that are transmitted to the attenuators D1, D2, D3, D4 or phase shifters PS1, PS2, PS3, PS4, in order to control the associated sub-antennas 11, 12, 13, 14, e.g., via the user data transmission module SM with high frequency signals of different phase and intensity. Depending on the use, other control values can be used according to the prior art.

To establish whether transmissions can be made at all and optionally with which transmission properties, in particular to determine the amplitudes A and phases P, an optimization device S3 and a decision device S4 are assigned to the steering module S2. The optimization device evaluates different factors or inputs of one or more or all of these assigned function units which can include the receiver device E, the antenna orientation module F and the threat management system TM. The receiver device E can be arranged separately. From this the optimum amplitudes A and phases P for the antenna control S1 and thus the optimum transmission properties are determined. Thereby a characteristic of the antenna lobe or transmission properties are aimed so as to ensure a narrow antenna main lobe with very small side lobes. Moreover, the orientation in an angular range to the relay aircraft 4 is taken into consideration depending on the threat with respect to the ground-based coordinate system upwards considering the current aircraft attitude and the respective aircraft positions so that the main lobe does not radiate into the threat area.

On the basis of specifications through a decision module S4 or the optimization device S3, the steering module S2 determines the radiation properties and the transmitting power of the antenna lobe directed at the relay aircraft 4. In another embodiment of the present invention the decision module S4 can be omitted. The radiation properties include the angular range of the radiation over the phase shift P for the phase shifters, the side lobe loss over the amplitudes A for the attenuators D1, D2, D3, D4. The transmitting power can likewise take place via the reduction of the loss of the attenuators or the amplification of the transmission signal. For their realization the steering module S2 features corresponding control members or digital control algorithms according to the prior art.

Specifications for the desired radiation properties, which preferably are included in the optimization device S3 in the form of probability figures, are transmitted to the optimization device S3 from the threat management system TM. This data transfer is labeled by reference number V1 in FIG. 4. Alternatively or additionally these data can also be transmitted as real desired values, i.e., as maximum or minimum values. The optimization device S3 calculates the desired radiation properties from an optimum or most valid radiation profile that is determined from the analysis and assessment of the current threat scenario. In addition, a digital terrain database can be assigned to the threat management system TM from which database threat data, such as, e.g., the position and type of enemy military positions as well as local terrain formations can be taken before and/or during the mission. From these data or from individual data thereof, the threat management system TM determines a maximum permissible or favorable angular range and a side lobe loss or a range for the side lobe loss for the configuration of the antennas and their antenna lobes. Furthermore the threat management system TM determines a maximum transmitting power or a transmitting power that is favorable on the basis of probabilities. These radiation properties are preferably connected to threat assessment figures so that these data reach the optimization device S3 as probabilities. The threat management system TM evaluates these input values preferably with a probability calculation or other optimization methods.

The optimization device S3 receives from the flight attitude computer or the antenna orientation module F the desired direction of the antenna lobe (reference number V2) to be realized by the steering unit S2. According to the present invention this is preferably realized in that the antenna orientation module F to this end determines the current relative spatial flight attitudes and the relative positions of the aircraft 1 and 4 to one another, i.e., the flight attitudes or positions of the aircraft 1 and 4 relative to one another. The antenna orientation module F moreover receives input data to determine the relative flight attitudes, positions of the aircraft 1, 4 or the relative position of these aircraft to one another. The flight attitudes of the aircraft with which a user data communication or a transmission of user data is to be operated, and optionally the flight attitudes of its own aircraft from an assigned system or module if this is not determined in the orientation module F itself. In one embodiment of the present invention, information on its own flight attitude can be made available to the antenna orientation module F from an assigned sensor system. Information such as flight attitude and position of the relay aircraft 4 is fed to the flight attitude computer F via the receiver device E (reference number V3). The antenna orientation module F determines from these values a desired direction for the antenna lobe that is fed to the optimization device S3 for assessment.

The optimization device S3 (reference number V3) can receive via the receiver device E data or information on the signal quality of the user data transmitted via the user data transmission module SM to the relay aircraft 4. With a digital user data transmission, the description of the signal quality can be made via valuation figures.

The optimization device S3 determines, from input values, at least one of: a desired radiation profile on the basis of the threat scenario; a desired direction of the antenna lobe on the basis of the relative position of the transmitting aircraft 1 relative to the relay aircraft 4 and the flight attitude of the transmitting aircraft 1; optionally data for describing the current transmission quality on the basis of information through the relay aircraft 4; and an antenna lobe to be produced by the steering module S2 or antenna transmission properties to be produced by the steering module S2.

The decision module S4 can be provided to decide to stop the user data transmission of the transmitting aircraft 1 when the probability of the locatability of the transmitting aircraft 1 exceeds a maximum value or an unfavorable value.

The pivoting of the antenna main lobe is realized through the control unit S or the steering module S2 expediently by a microprocessor that determines the phase relationships of the individual antennas according to the determination of the adjustment angle for the antenna diagrams to be produced resulting from the flight attitudes and the positions of both aircraft and communicates them to the phase shifters PS1, PS2, PS3, PS4 and the attenuators. An automatic pivoting of the antenna main lobes depending on the relative aircraft attitudes and/or also the relative positions of the aircraft 1 and 4 is thus possible.

The levels for the steering of the sub-antennas (tapering) are established by variable attenuators such that the side lobe loss is very great, whereby a value of at least 30 dB is to be aimed for. The resulting smaller gain of the antenna is compensated for by a greater antenna surface. This is easily possible, since plenty of room is available on the wing.

Establishing contact between the aircraft 1 and 4, in particular during an unplanned mission, can be carried out by implementing a locating signal transmitted by aircraft 1. To this end the antenna field of the aircraft 1 can be configured such that a wide main lobe forms with which the aircraft 4, only "listening," can determine the position of aircraft 1. After establishing the transmission, on the basis of the assessment by the optimization device S3, the transmission can then occur by transmission properties according to the specifications of the optimization device S3.

Very flat antennas, e.g., patch antennas or slot antennas that are easy to integrate into the wing structure are expediently used as sub-antennas for the antenna field. The efficiency of these antennas is of no great importance due to the high antenna gain and to the relatively small distance to be bridged of only 20 to a maximum of 30 km (maximum flight altitude for the relay aircraft), such that the transmitting power is very low anyway.

In order to keep the radiation outside the transmission path as low as possible, the control unit S furthermore contains a device for level control (not shown separately in FIG. 4) that reduces the transmitting power to a value that is just necessary for data transmission (power management). The control occurs through a feedback signal of the receiving station.

Another advantage of this type of data transmission is the fact that only a small capacity for the power supply is necessary for the reconnoitering aircraft 1 (as a rule a small unmanned aircraft).

A user data transmission with a transmitting power that is greatly reduced compared to the prior art, in particular, outside the main transmission direction is possible through the tracking system N according to the present invention, which transmission is determined by the small distance between the two aircraft as well as by a great gain of the antennas from aircraft 1 and aircraft 4 and the automatic reduction of the transmitting power to the transmitting power absolutely necessary for data transmission (power management). An extremely small radiation in the direction of the hostile ground-based station 3 is achieved due to a high side lobe loss according to the present invention of the antenna diagram of aircraft 1 that can be easily realized due to the large available surface on the top and bottom of the wing.

According to the present invention, a power management according to the prior art can be omitted or realized only in a limited manner, i.e., at low expense. In this case a specific transmission level can be firmly set. The control range for the orientation of the antenna diagram is provided to be relatively small, since the flight altitude is not provided above 25 km.

What is claimed is:

1. A device for user data transmission implemented in an aircraft for transmitting user data to a relay aircraft, the device comprising:
   a controllable directional antenna arrangement;
   an antenna steering module that is structured and arranged to control radiation properties and transmitting power of the antenna arrangement;
   an antenna orientation module;
   a threat management system; and
   an optimization device,
   wherein the threat management system and the optimization device are associated with the antenna steering module and the optimization device receives a desired radiation profile from the threat management system and a desired direction range of an antenna lobe from the antenna orientation module.

2. The device according to claim 1 further comprising:
   a user data transmission module that is configured to provide user data to the relay aircraft; and
   a receiver device that receives information from the relay aircraft.

3. The device according to claim 2 wherein the optimization device determines antenna transmission properties to be produced by the antenna steering module and transmits the antenna transmission properties to the steering module as a control command.

4. The device according to claim 3, wherein the antenna transmission properties include one of an angular range, a side lobe loss for radiation of the antenna lobes, and a maximum transmitting power.

5. The device according to claim 3 wherein the threat management system receives and uses information on a current transmission quality, in which the current transmission quality is determined by the receiver, based on the information from the relay aircraft.

6. The device according to claim 3 wherein the desired direction range of the antenna lobe is determined in the antenna orientation module on a basis of a relative position of the transmitting aircraft relative to the relay aircraft and a flight attitude of the transmitting aircraft.

7. The device according to claim 3 further comprising:
   a decision device connected to the antenna steering module that is structured and arranged to stop the user data transmission of the transmitting aircraft when a probability of a locatability of the transmitting aircraft exceeds a comparative value.

8. The device according to claim 3 further comprising:
   an antenna control unit that is structured and arranged to set the transmission properties such that a side lobe loss is at least 30 dB.

9. The device according to claim 1 wherein the antenna orientation module is associated with a flight attitude computer.

10. A method for user data transmission in which user data is transmitted from a first aircraft to a relay aircraft for retransmission to another aircraft, the method comprising:
    arranging a device for user data transmission in the first aircraft and the relay aircraft;
    assessing a desired radiation profile by a threat management system; and
    obtaining a desired direction range of an antenna lobe by an antenna orientation module.

11. The method for user data transmission according to claim 10, further comprising:
    determining a current transmission quality based upon information fed to a receiver.

12. The method according to claim 10 wherein optimization of the transmission properties takes place in the transmitting aircraft.

13. An aircraft having a data transmission device using the method according to claim 10, wherein the aircraft is the first aircraft.

14. A device for user data transmission for an aircraft comprising:
   a controllable directional antenna arrangement;
   an antenna steering module that is structured and arranged to control radiation properties and transmitting power of the antenna arrangement;
   an antenna orientation module;
   a threat manager; and
   an optimizer,
   wherein the threat manager and the optimizer are associated with the antenna steering module and the optimizer receives a desired radiation profile from the threat manager and a desired direction range of an antenna lobe from the antenna orientation module.

15. The device according to claim 14 further comprising:
   a user data transmitter that is configured to transmit user data to a relay aircraft; and
   a receiver that receives information from the relay aircraft.

16. The device according to claim 15 wherein the optimizer device determines antenna transmission properties to be produced by the antenna steering module and transmits the antenna transmission properties to the steering module as a control command.

17. The device according to claim 16, wherein the antenna transmission properties include one of an angular range, a side lobe loss for radiation of the antenna lobes, and a maximum transmitting power.

18. The device according to claim 16 wherein the threat manager receives and uses information on a current transmission quality, in which the current transmission quality is determined by the receiver based on the information from the relay aircraft.

19. The device according to claim 16 wherein the desired direction range of the antenna lobe is determined in the antenna orientation module on a basis of a relative position of the transmitting aircraft relative to the relay aircraft and a flight attitude of the transmitting aircraft.

20. The device according to claim 16 further comprising:
   a decider connected to the antenna steering module that is structured and arranged to stop the user data transmission of the transmitting aircraft when a probability of a locatability of the transmitting aircraft exceeds a comparative value.

21. The device according to claim 16 further comprising:
   an antenna controller that is structured and arranged to set the transmission properties such that a side lobe loss is at least 30 dB.

22. A method for user data transmission in which user data is transmitted from an aircraft, the method comprising:
   determining a desired radiation profile by a threat management system;
   determining a desired direction range of an antenna lobe by an antenna orientation module; and
   transmitting the user data with the desired radiation profile and in the desired direction range.

23. The method for user data transmission according to claim 22, further comprising:
   determining a current transmission quality based upon information fed to a receiver.

* * * * *